United States Patent
Sridhara et al.

(10) Patent No.: US 8,306,552 B2
(45) Date of Patent: Nov. 6, 2012

(54) PATTERN FILTERING FOR MOBILE STATION POSITION ESTIMATION

(75) Inventors: Vinay Sridhara, Santa Clara, CA (US); Saumitra Mohan Das, San Jose, CA (US); Andrew C Blaich, Notre Dame, IN (US)

(73) Assignee: QUALCOMM Incorporated, San Diego, CA (US)

( * ) Notice: Subject to any disclaimer, the term of this patent is extended or adjusted under 35 U.S.C. 154(b) by 155 days.

(21) Appl. No.: 12/870,654

(22) Filed: Aug. 27, 2010

(65) Prior Publication Data

US 2011/0143772 A1 Jun. 16, 2011

Related U.S. Application Data

(60) Provisional application No. 61/285,504, filed on Dec. 10, 2009.

(51) Int. Cl.
*H04W 64/00* (2009.01)
(52) U.S. Cl. .................. 455/456.1; 455/404.2
(58) Field of Classification Search ............... 455/404.2, 455/456.1–3, 456.5–6, 457, 9, 11.1, 12.1, 455/13.2, 67.11, 115.1
See application file for complete search history.

(56) References Cited

U.S. PATENT DOCUMENTS

| | | | |
|---|---|---|---|
| 6,188,913 B1 * | 2/2001 | Fukagawa et al. | 455/562.1 |
| 7,107,085 B2 * | 9/2006 | Doi | 455/575.7 |
| 2004/0203904 A1 | 10/2004 | Gwon et al. | |
| 2005/0206566 A1 | 9/2005 | Stilp et al. | |
| 2005/0255855 A1 | 11/2005 | Spirito et al. | |
| 2005/0261004 A1 | 11/2005 | Dietrich et al. | |
| 2006/0089153 A1 | 4/2006 | Sheynblat | |
| 2008/0095131 A1 * | 4/2008 | Aljadeff et al. | 370/342 |
| 2008/0112468 A1 * | 5/2008 | Sheynblat et al. | 375/148 |
| 2008/0214208 A1 | 9/2008 | Gordon et al. | |
| 2009/0098888 A1 * | 4/2009 | Yoon | 455/456.2 |
| 2009/0221299 A1 * | 9/2009 | Macdonald et al. | 455/456.1 |

FOREIGN PATENT DOCUMENTS

GB 2408162 A 6/2005
WO WO2008069446 A1 6/2008

OTHER PUBLICATIONS

International Search Report and Written Opinion—PCT/US2010/059569, International Search Authority—European Patent Office—Mar. 25, 2011.
"Performance Estimations of Mobile Terminal Location with Database Correlation in UMTS Networks", Fourth International Conference on 3G Mobile Communication Technologies, Jun. 25-27 2003: London, UK, IEE Conference Publication 494, pp. 400-403.

* cited by examiner

*Primary Examiner* — Cong Tran
(74) *Attorney, Agent, or Firm* — Jimmy Cheng; Arnold J. Gum

(57) ABSTRACT

Examples disclosed herein may relate to filtering one or more signal attribute patterns from use in position estimation for a mobile station based at least in part on an error value associated with an initial estimated position of the mobile station.

36 Claims, 7 Drawing Sheets

PATTERN FILTERING FOR MOBILE STATION POSITION ESTIMATION

CROSS-REFERENCES TO RELATED APPLICATIONS

This application claims priority to provisional patent application Ser. No. 61/285,504, entitled "Targeted and Efficient Pattern Matching", filed on Dec. 10, 2009, assigned to the assignee hereof, and expressly incorporated herein by reference.

BACKGROUND

1. Field

Subject matter disclosed herein relates to filtering one or more signal attribute patterns from use in mobile station position estimation.

2. Information

The position of a mobile station, such as a cellular telephone, may be estimated based on information gathered from various systems. One such system may comprise a wireless local access network (WLAN) communication system comprising a number of access points to support communications for a number of mobile stations. A position estimate for a mobile station may be obtained, for example, by performing pattern matching operations that may compare characteristics of wireless signals received at a mobile station with patterns of such characteristics stored in a database, wherein the individual patterns stored in the database are associated with predetermined locations. By finding a pattern in the database that most closely matches the characteristics exhibited by the wireless signals received at a mobile station, the predetermined location associated with the matching pattern may be used as an estimated position of the mobile station.

SUMMARY

In an aspect, an error value associated with an initial estimate of a position of a mobile station may be determined. One or more patterns may be selected from among a plurality of patterns associated with predetermined locations for associating with one or more wireless signals received at a mobile station, wherein the selected one or more patterns are associated with a region defined by the initial estimate and an error value. Of course, it should be understood that this is merely an example implementation, and that claimed subject matter is not limited in this respect.

BRIEF DESCRIPTION OF THE FIGURES

Non-limiting and non-exhaustive examples will be described with reference to the following figures, wherein like reference numerals refer to like parts throughout the various figures.

DETAILED DESCRIPTION

Figure 1:
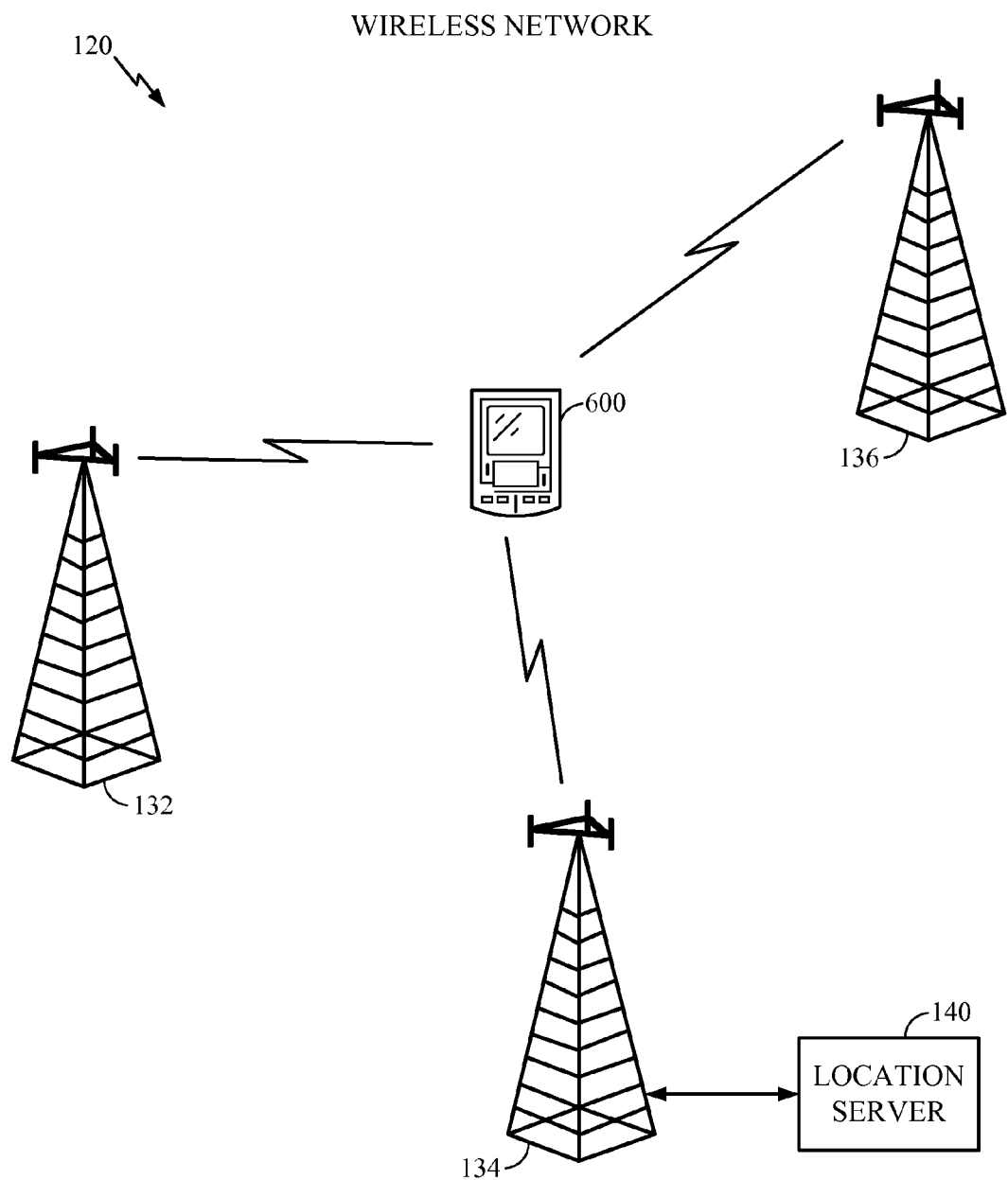
FIG. 1 is a schematic block diagram depicting an example mobile station in communication with an example wireless communication network.

As discussed above, the position of a mobile station, such as a cellular telephone, may be estimated based on information gathered from various systems. One such system may comprise a wireless local access network (WLAN) communication system comprising a number of access points to support communications for a number of mobile stations. A position estimate for a mobile station may be obtained, for example, by performing pattern matching operations that may compare characteristics of wireless signals received at a mobile station with patterns of such characteristics stored in a database. Such individual patterns stored in the database may be associated with predetermined locations. Characteristics of wireless signals received at a mobile station may be referred to as an input signature. By identifying a pattern in the database that most closely matches an input signature, a predetermined location associated with the matching pattern may be used as an estimated position of the mobile station. Pattern matching techniques may be utilized advantageously in indoor situations, although claimed subject matter is not limited in scope in this respect. For example, pattern matching techniques for estimating a location of a mobile station may be utilized in outdoor situations as well.

The pattern matching approach to estimating a position of a mobile station may have a potential disadvantage of storing and comparing relatively large numbers of patterns measured or otherwise gathered from a relatively large number of locations in order to provide desired levels of accuracy. The greater the desired level of accuracy, the greater the number of locations from which patterns of wireless signal characteristics are measured and stored. Large databases utilize correspondingly large amounts of storage space, and large databases may also utilize correspondingly large amounts of computing resources to perform the pattern matching operations. Storage capacity and processing resources may not present significant difficulties if such operations are performed on a network server in some, but not all, situations. However, there are situations where it may be advantageous to have a mobile station perform pattern matching operations. For example, in some situations, a mobile station may not have network connectivity, and therefore may not have access to a network server. Or, in other situations, such as with a cellular network where latencies may be relatively high, a high volume of input signatures that would be sent from a large number of mobile stations to a network server in order to perform pattern matching operations may result in a relatively large increase in system overhead, negatively affecting overall cellular system capabilities. Another example situation where it may be advantageous to have a mobile station perform pattern matching operations rather than a network server is where greater user privacy is desired. By performing pattern matching operations at a mobile station, input signatures are not sent to a network server, but are rather kept at the mobile station. Of course, there may be other reasons why it would be advantageous to have a mobile station perform the pattern matching. Examples techniques described herein may provide efficient pattern matching for mobile stations.

In an aspect, and as described more fully in the description to follow, a technique is provided to reduce the number of patterns to be matched against an input signature received at a mobile station to provide a position estimate for the mobile station. In an example technique, an initial estimate may be made for a position of a mobile device, and an error value may be associated with that initial estimate. For example, trilateration, triangulation, or multilateration operations may be utilized using signals received from various access points or other wireless transmitters to determine an initial estimate for the position of the mobile station. Additional techniques for determining an initial estimate of a position of a mobile station may include, for example, utilizing a previously determined location estimate based on one or more satellite positioning system (SPS) (e.g., GPS, Galileo, GLONASS, etc.) signals to approximate an initial estimate. Sensors in a mobile device such as, for example, accelerometers or gyroscopes, may be utilized to determine an initial estimate of a position of the mobile device based on a previously estimated location, for another example technique. It should be noted that claimed subject matter is not limited to any particular technique for determining an initial position of a mobile station. In an aspect, the initial estimate may be made without using pattern matching.

An initial estimate of the position of the mobile station may have an amount of error due to any of a number of factors. An error value, for example, may be expressed as a distance from an initial estimated location of the mobile station. A number of patterns to be matched against an input signature may be reduced to those patterns associated with locations that lay within a region defined by an initially estimated position of the mobile station and an error value. Here, patterns associated with locations that lay outside of the region defined by the initial estimated position and the error value may be ignored. Such a reduction in patterns involved in a pattern matching operation may provide a number of advantages, including, for example, reducing an amount of time to produce a result for a given processing resource. Other advantages that may be realized through such a reduction in patterns involved in a pattern matching operation may include a reduction in power consumption due in part to a reduction in processor workload. For a situation such as a mobile station with perhaps more restrictive processing resources as compared to a network server resource, for example, a reduction in patterns involved in the pattern matching operations may be advantageous.

FIG. 1 is a schematic block diagram of a wireless network 120 in communication with a mobile station 600. Wireless network 120, for this example, may provide voice or data communication for a number of wireless terminals including mobile station 600, for example, and may further support initial position estimation for the wireless terminals in addition to providing voice or data communication. Wireless network 120 may comprise any of a number of wireless network types, several examples of which are described below. Wireless network 120 for this example comprises terrestrial-based wireless transmitters 132, 134, and 136 that provide communication for a number of mobile stations such as, for example, mobile station 600. For simplicity, only a few transmitters 132, 134, and 136 are depicted and one mobile station 600 is depicted in FIG. 1. Of course, other examples may include a smaller or greater number of transmitters, and the configuration of transmitters depicted in FIG. 1 is merely an example configuration.

In an aspect, mobile station 600 may obtain one or more measurements from one or more signals received from one or more of the terrestrial transmitters 132, 134, and 136. As previously mentioned, one or more characteristics of one or more wireless signals received at a mobile station may be referred to as an "input signature". For example, mobile station 600 may gather propagation delay information or signal strength information through communication with one or more of wireless transmitters 132, 134, and 136. Mobile station 600 may calculate an initial estimate for the position of mobile station 600 through trilateration based, at least in part, on timing calibration parameters such as round trip delay or code phase detections, signal strength estimates, or other measurements obtained through communication with one or more of wireless transmitters 132, 134, or 136, and further based, at least in part, on known or reported locations of the wireless transmitters 132, 134, or 136. It should be understood however, that these are merely examples of signal characteristics that may be used to form an input signature, and claimed subject matter is not limited in this respect. In a further aspect, one or more of the example wireless signal characteristics mentioned above, such as signal strength estimates or propagation delay timing information, for example, may form an input signature for use in pattern matching operations to provide an improved position estimate for mobile station 600.

In another aspect, initial position estimate operations for mobile station 600 may be performed by a network entity such as, for example, location server 140 depicted in FIG. 1, rather than at mobile station 600. Such a determination of an initial position may be based, at least in part, on information gathered by mobile station 600 from one or more of wireless transmitters 132, 134, and 136. In a further aspect, location server 140 may transmit an initial position estimate to mobile station 600 which is based on information previously provided by mobile station 600. In a further aspect, location server 140 may perform pattern matching operations based at least in part on input signature information provided by mobile station 600 and further based at least in part on a database of input signatures observed at a number of predetermined locations. As used herein, the term "predetermined location" refers to a location associated with a stored pattern of one or more characteristics of one or more wireless signals received at one or more mobile stations. A predetermined location, as used herein, may also be referred to as a measurement location. A plurality of locations associated with a respective plurality of patterns stored in a database may be referred to as a plurality of predetermined locations.

Also, as previously described, the term "pattern" as used herein refers to one or more characteristics of one or more wireless signals received at a mobile station. For merely one example, a pattern may comprise signal strength values for wireless signals transmitted from one or more wireless transmitters and received at a mobile station and as measured or otherwise observed at the mobile station. Such a pattern may be associated in a database with an estimated or measured location of the mobile station at the time the signal strengths were estimated. The estimated or measured location associated with the pattern of wireless signal characteristics may be referred to as a predetermined location associated with the pattern, as discussed above. Many such patterns may be observed at any number of locations in order to form a database of patterns and their associated predetermined locations. It should be noted that signal strength is merely one example wireless signal characteristic that may be utilized in a pattern or input signature, and the scope of claimed subject matter is not limited in this respect. Other wireless signals characteristics may include, but are not limited to, signal phase and signal timing, for example.

In an aspect, one or more of wireless transmitters 132, 134, and 136 may further couple mobile station 600 to one or more other systems and networks, such as, for example, a public switched telephone network (PSTN), a local area network (LAN), and/or a wide area network such as the Internet, to name merely a few examples. For the example depicted in FIG. 1, mobile station 600 may access location server 140 by way of transmitter 134. Location server 140 may collect and format location data, including gathering input signature information from one or more mobile stations at various locations to form a pattern database, may provide assistance to mobile stations for position estimation operations, or may perform computations or pattern matching operations to obtain position estimates for the mobile stations.

In an aspect, the locations of one or more wireless transmitters in a wireless system such as wireless network 120 may be known at a mobile station such as mobile station 600, with the locations provided by the transmitters themselves. For example, mobile station 600 may obtain such location information as part of an almanac, sometimes referred to as a "base station almanac", provided by an almanac server entity, over a communication network, for example.

Figure 2:
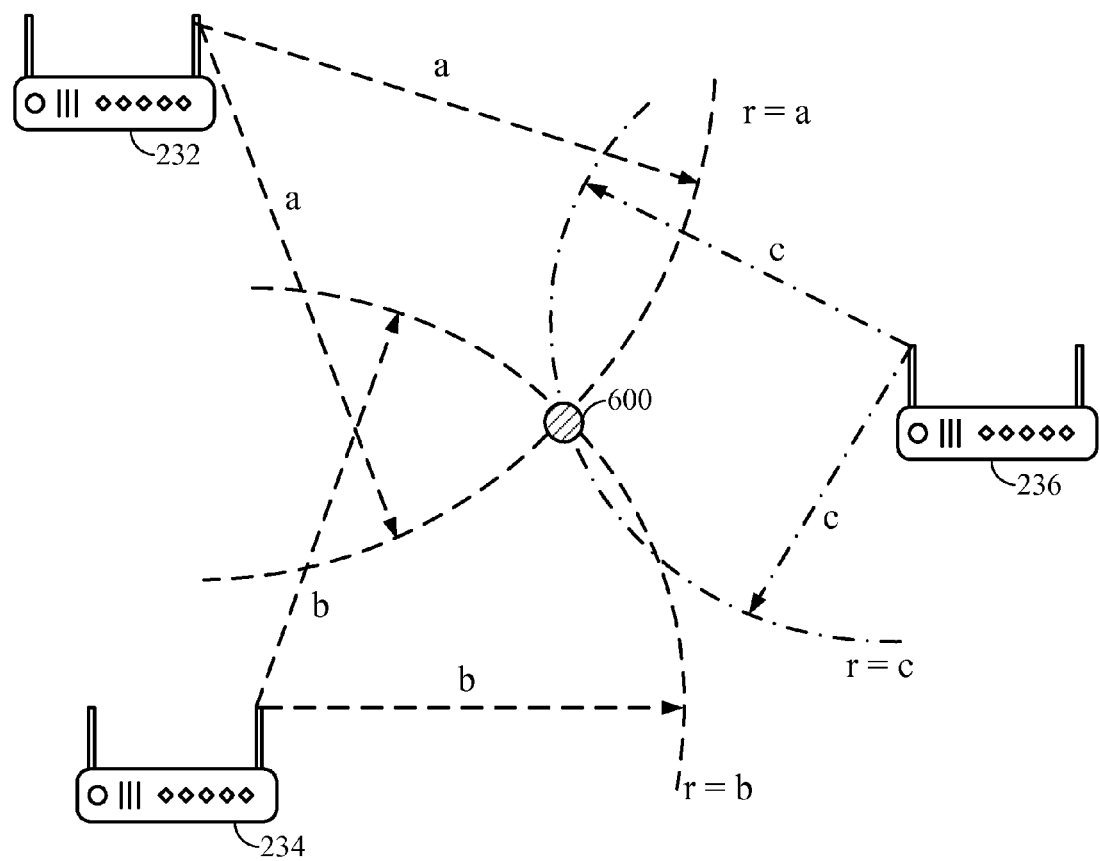
FIG. 2 is a schematic block diagram depicting an example trilateration technique for determining an initial estimated position for a mobile station.

FIG. 2 depicts an example trilateration technique for determining an initial estimated position for mobile station 600. For the present example, mobile station 600 may receive wireless signals from a number of transmitters. In this example, access points 232, 234, and 236 are shown. In other examples, mobile station 600 may receive wireless signals from a greater or smaller number of transmitters. In an aspect, to perform a trilateration position estimate, signals from three or more access points may be received. One or more characteristics of the received signals may be measured or otherwise obtained, and the respective signal characteristics may be used to estimate a range, or distance, between the wireless transmitters and a mobile station. In general, the closer a receiving device is to the transmitting device, the stronger the received signal strength, for example. However, signal strength is merely one example of a signal characteristic, and the scope of claimed subject matter is not limited in this respect. In the case of a signal strength characteristic, a mobile station in relatively close proximity to an access point may expect to receive a signal of relatively high signal strength from the access point, and a mobile station located a greater distance from the access point may expect to receive a signal of lower signal strength. Various mathematical models may be utilized to estimate a range between a mobile station and an access point, and the scope of claimed subject matter is not limited in this respect.

In an aspect, a strength of a signal received at a mobile station may be measured by the receiving mobile station. In another example, a mobile station may transmit a signal to an access point and the access point may measure the signal strength of the received signal and return a signal strength value to the mobile station. The scope of claimed subject matter is not limited to any particular technique for obtaining a signal strength value for a communication between a transmitting device and a receiving device. Further, as mentioned previously, signal strength is merely an example signal characteristic, and the scope of claimed subject matter is not limited in this respect.

For the present example, as depicted in FIG. 2, mobile station 600 may receive a transmission from access point 232, and based at least in part on one or more characteristics of the received signal, a range "a" may be measured. Similarly, a range "b" may be measured between access 234 and mobile station 600 based at least in part on one or more characteristics of a signal transmitted by access point 234, and a range "c" may be measured between access point 236 and mobile station 600 based at least in part on one or more characteristics of a signal transmitted by access point 236 received at mobile station 600. If the locations of access points 232, 234, and 236 are known, as is assumed for the present example, a trilateration operation using techniques known to those of ordinary skill in the art may be used to determine an intersection point of all of the arcs formed by the aforementioned measurements of ranges "a", "b", and "c", and the intersection point may be designated an initial estimate of a position for mobile station 600.

If positions of access points 232, 234, and 236 are accurate, and if respective measurements of ranges "a", "b", and "c" are accurate, an accurate position estimate may be obtained for mobile station 600. However, if any of the reported positions of the transmitters are inaccurate, such inaccuracy may be reflected in the initial estimate of a position of the mobile station. Similarly, even if the locations of the transmitters are accurate, any inaccuracies in the measured ranges "a", "b", or "c" may result in an inaccurate initial position estimation.

Although examples described herein discuss measuring ranges between transmitting devices and receiving devices based at least in part on signal strength, the scope of claimed subject matter is not limited in this respect. Estimating ranges between transmitting devices and receiving devices based at least in part on signal strength is merely one example technique for estimating and/or measuring such ranges. Other techniques may include, for example, measuring and/or estimating such ranges based at least in part on signal phase and/or signal timing, e.g., round trip delay. Again, the scope of claimed subject matter is not limited in theses respects. Whichever techniques are utilized to measure ranges in particular example implementations for performing trilateration operations, the trilateration technique may determine a position of a mobile station within an average error range, depending on any of multiple factors. Example factors that may contribute to an error measuring range for trilateration operations are mentioned above, and may include, but are not limited to, inaccuracies in measuring ranges from signal strength measurements or from signal propagation timings. In an aspect, an error value for an initial estimate for a position of a mobile station may be expressed as a distance, or range, from the estimated point, estimated based on trilateration, for example.

In one or more aspects, an error value associated with an initial position of a mobile station may be based, at least in part, on a variability of ranging measurements from a mobile station to one or more access points. For example, if a signal strength of a wireless signal measured at a mobile station from an access point varies from a signal strength value x to a value y at a particular location, ranges from the mobile station to the access point may be estimated according to a signal strength-to-range mapping function varying from range values A to B. Such variances may be determined for a plurality of measurements, and in an aspect a greatest variance from among the plurality of measurements may be utilized as an error value.

In another aspect, an initial position of a mobile station may be estimated at least in part utilizing trilateration. Based at least in part on the estimated location, distances to one or more access points may be determined. For individual access points of the one or more access points, the distance to the mobile station may be compared with minimum and maximum range values stored at the access point, with the difference between the distance from the access point to the mobile station and the minimum and/or maximum range values observed from that access point defining an error. The error may be represented as a circle with a radius equal to the difference between the distance from the access point to the mobile station and the minimum and/or maximum range values observed from that access point. For example, an access point has an observed minimum range of 7 and an observed maximum range of 11, and an estimated distance from an access point to a mobile station is 8. It may be determined upon comparing the estimated distance with the minimum and maximum range values that the estimated distance of 8 has a difference of 1 when compared to the minimum range value of 7 and a difference of 3 when compared to the maximum range value of 11. It may be determined that since the difference of 3 is bigger than the difference of 1, the value 3 may be utilized as the radius of a circle representing the error. This circle may be centered at the estimated location of the mobile station. An error region may comprise a union of a plurality of such circles defined for a plurality access points whose signals were received as part of initial position estimation operations for the mobile station.

In an additional aspect, an initial position of a mobile station may be estimated at least in part utilizing one or more sensors in the mobile station. Sensors may include an accelerometer or a gyroscope, to name but a couple of examples, although the scope of claimed subject matter is not limited in this respect. Techniques for determining an initial position of a mobile station utilizing sensors may have confidence parameters that may be utilized for error range estimates. Still other techniques may have confidence parameters appropriate for those techniques that may be utilized to estimate an error range. The scope of claimed subject matter is not limited to any particular technique for determining an initial estimate of a position of a mobile station, nor is the scope of claimed subject matter limited to any particular technique for estimating an error range.

Figure 3:
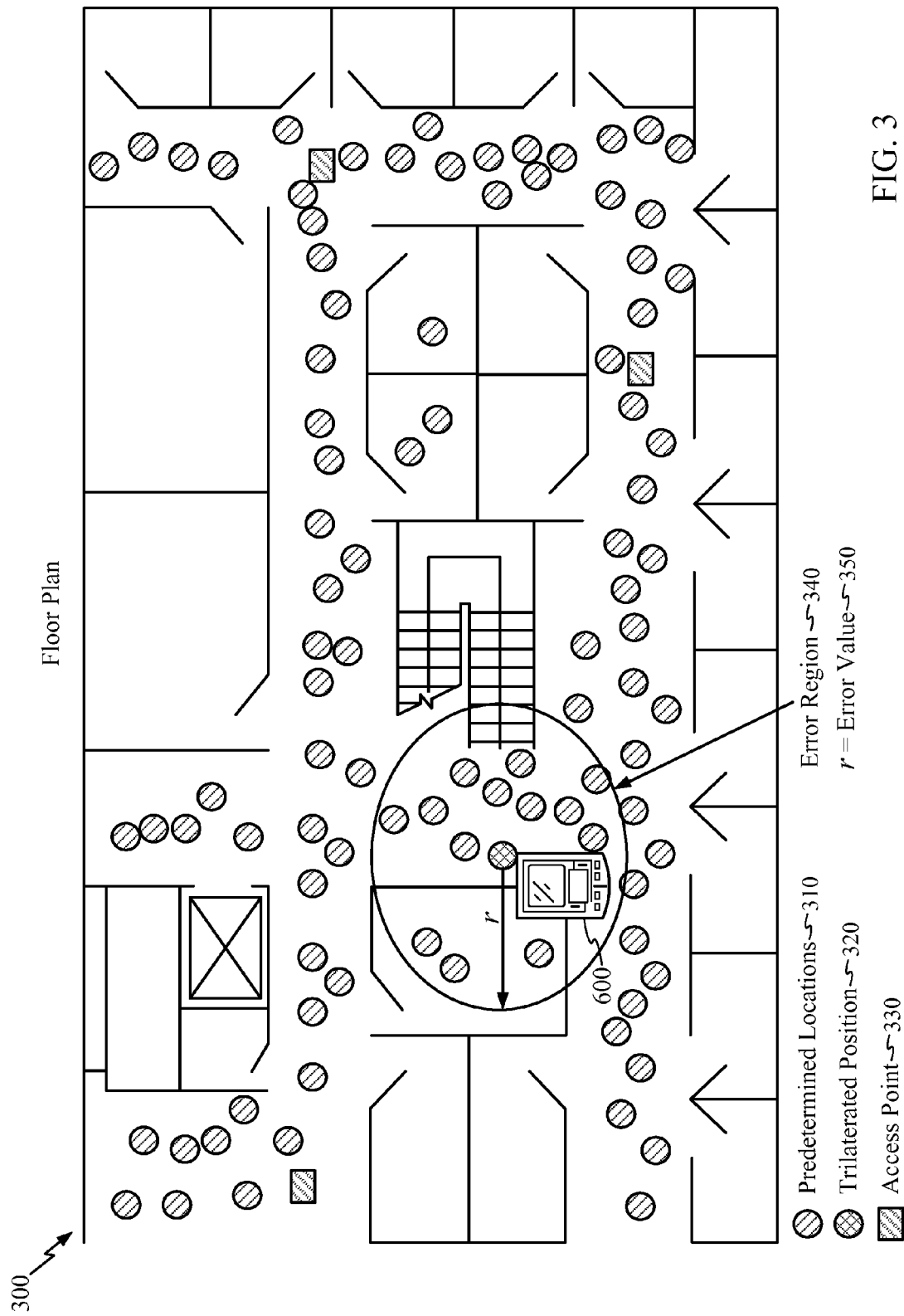
FIG. 3 is a schematic block diagram depicting an example floor plan including wireless access points and locations from which wireless signal characteristic patterns have been measured or otherwise observed.

FIG. 3 is a schematic block diagram depicting an example partial floor plan 300 of an interior of one floor of an example office building. Of course, floor plan of 300 is merely an example, and the scope of claimed subject matter is not limited to any particular floor plan, building type, or building size. Further, the scope of claimed subject matter is not limited to indoor implementations. Example techniques described herein may also be utilized outdoors.

For the particular example of FIG. 3, partial floor plan 300 comprises three wireless access points 330, and a number of predetermined locations 310 from which wireless signal characteristic patterns have been previously measured or otherwise observed. Also for the particular example of FIG. 3, patterns associated with respective predetermined locations 310 may be stored in a database, as mentioned above. Although the example depicted in FIG. 3 utilizes three access points, the scope of claimed subject matter is not limited in this respect, and other example implementations may utilize any number of access points. Further, the configuration of access points 330 depicted in FIG. 3 is merely an example configuration, and again the scope of claimed subject matter is not limited in this respect. Similarly, the number and arrangement of predetermined locations 310 are merely examples, and claimed subject matter is not limited in scope in these respects.

Also depicted in FIG. 3 is a trilaterated position 320. Trilaterated position 320 represents an initial estimate of a position for mobile station 600. As discussed above in connection with FIGS. 1 and 2, one example technique for determining an initial estimate of a position of a mobile station involves trilateration using range measurements to three or more wireless transmitters. The range measurements may be based on signal strength estimates, signal timing parameters such as round trip delay or code phase, or other signal characteristics, for example. Of course, trilateration is merely an example technique for determining an initial estimate for a position of a mobile station, and the scope of claimed subject matter is not limited in this respect.

As also discussed above, techniques for determining an initial estimate of a position for a mobile station may exhibit inaccuracies. Such inaccuracies may be accounted for by selecting or calculating an error value 350. In an aspect, error value 350 may be expressed as a distance from an initial estimate of a position of a mobile station. In FIG. 3, the initial estimate of the position of mobile station 600 is represented as trilaterated position 320. Error value 350 may be expressed as a distance r from trilateration point 320, and an error region 340 may comprise an ellipse defined by trilateration point 320 and error value 350. Although mobile station 600 is depicted in FIG. 3 as existing at a particular position within error region 340, the actual position of mobile station 600 may be anywhere within error region 340 defined by trilaterated position 320 and error value 350. Also, although error region 340 is depicted in FIG. 3 as an ellipse or circle, the scope If claimed subject matter is not limited in these respects. Rather, an error region may take any shape, for any of a variety of example implementations.

At least in part in response to determining error region 340, a subset of patterns may be selected from among a greater number of patterns associated with floor plan 300 in order to perform a pattern matching operation to determine an improved estimate of the position of mobile station 600, in an aspect. Rather than performing a pattern matching operation over the entire database of patterns for floor plan 300, a smaller number of patterns may be selected for pattern matching by determining which of predetermined locations 310 are located within error region 340. In this manner, all of the patterns associated with locations that lay outside of error region B340 may be filtered out from the pattern matching operation, and the pattern matching operation may be accomplished in less time and/or with fewer computing resources.

To perform the pattern matching operation, mobile station 600 may receive wireless signals from access points 330, for example. An input signature may be observed based on one or more characteristics of the received wireless signals, and that input signature may be compared with patterns associated with locations falling within error region 340. In an aspect, a goal of the comparisons may be to find a closest matching pattern to the input signature. The predetermined location associated with the closest matching pattern may be utilized as an improved estimated position for mobile station 600.

In a further aspect, pattern matching operations, including, for example, calculations involved in comparing an input signature with stored patterns of wireless signal characteristics, may be performed by mobile station 600. Mobile station 600 may store a larger database of patterns associated with predetermined locations for a relatively large area, for example, or in another aspect, such a larger database may be stored at a network resource such as, for example, location server 140 depicted in FIG. 1. Location server 140 may further perform the pattern matching operations and may provide a resulting estimated position for mobile station 600 to mobile station 600 through one of access points 330.

In an aspect, as mobile station 600 enters a building, a database of pattern information may be provided to mobile station 600 and the database may be stored in a storage medium local to the mobile station. In this manner, as mobile station 600 moves within the building, mobile station 600 may have access to the patterns to enable performing position estimates. The example techniques presented may be utilized to further reduce a number of patterns for comparison during position estimation operations for mobile station 600.

In another aspect, a relatively large database of patterns may be located on a network server such as location server 140. At least in part in response to a determination of an initial estimate of a position of a mobile station, a subset of patterns associated with predetermined locations falling within an error region may be transmitted to the mobile station, and the mobile station may perform the pattern matching operations to determine an improved position estimate. For example, in response to a determination of trilateration position 320, a location server such as server 140 may provide a subset of patterns from a larger database of patterns stored at the location server. In an aspect, the subset of patterns may comprise patterns associated with predetermined locations that fall at least partially within error region 340. Mobile station 600 may perform pattern matching operations over the received subset of patterns to determine an improved estimate of a position for the mobile station.

As noted above, in one or more aspects, an estimated initial position of mobile station 600 may be determined at mobile station 600 or at location server 140, and pattern matching operations involving subsets of patterns may be performed at mobile station 600 or at location server 140. As also noted above, in a situation where mobile station 600 is to perform the pattern matching operations, local server 140 may provide a subset of patterns to mobile station 600 rather than having mobile station 600 store a larger database of patterns, in order to reduce network communication overhead. Of course, these are merely examples of entities that may determine initial estimated positions for a mobile station and of entities that may perform pattern matching operations, and the scope of claimed subject matter is not limited in these respects. Additionally, error values associated with estimated initial positions of a mobile station may be determined by the mobile station in an aspect, or by a location server, in another aspect. However, again, the scope of claimed subject matter is not limited in this respect.

As used herein, the term "access point" is meant to include any wireless communication station and/or device used to facilitate communication in a wireless communications system, such as, for example, a wireless local area network, although the scope of claimed subject matter is not limited in this respect. Similarly, the term "access point" is meant to include a "base station" that may facilitate wireless communication in a cellular telephone network, for example. Also, as used herein, the terms "access point", "wireless transmitter", and "base station" may be used interchangeably, as each term is meant to include any device used to facilitate communication in a wireless communication system. In another aspect, an access point may comprise a wireless local area network (WLAN) access point, for example. Such a WLAN may comprise a network compatible with one or more versions of IEEE standard 802.11 in an aspect, although the scope of claimed subject matter is not limited in this respect. A WLAN access point may provide communication between one or more mobile stations and a network such as the Internet, for example. In another aspect, an access point may comprise a femtocell.

As used herein, the term "mobile station" (MS) refers to a device that may from time to time have a position location that changes. The changes in position location may comprise changes to direction, distance, orientation, etc., as a few examples. In particular examples, a mobile station may comprise a cellular telephone, wireless communication device, user equipment, laptop computer, other personal communication system (PCS) device, personal digital assistant (PDA), personal audio device (PAD), portable navigational device, and/or other portable communication devices. A mobile station may also comprise a processing unit and/or computing platform adapted to perform functions controlled by machine-readable instructions.

Returning once more to FIG. 3, for the present example, the communication system may comprise a wireless system compliant to and/or compatible with one or more versions of IEEE standard 802.11x. Further example wireless communication systems are mentioned below, and the scope of claimed subject matter is not limited to any particular wireless network type.

In an aspect, a characteristic of a wireless signal that may be utilized as at least part of an input signature or utilized to measure a range in a trilateration operation may comprise a signal strength measurement. In an aspect, a signal strength measurement may be expressed as a received signal strength indicator (RSSI). RSSI for the examples described herein may comprise an element of versions of IEEE standard 802.11, although the scope of claimed subject matter is not limited in this respect. RSSI may comprise an integer value reported by a receiving device to a transmitting device to indicate a signal strength for a transmission received from the transmitting device. In this manner, mobile station 600 may transmit a signal to an access point 330 that may require an acknowledgement transmission from access point 330, and mobile station 600 may compute an RSSI value from the received acknowledgement transmission. Additionally, an access point 330 may calculate an RSSI value from the transmission received from mobile station 600, and mobile station 600 may receive an RSSI value back from access point 330 in the acknowledgement transmission in response to the transmission from mobile station 600 or in a subsequent transmission.

Figure 4:
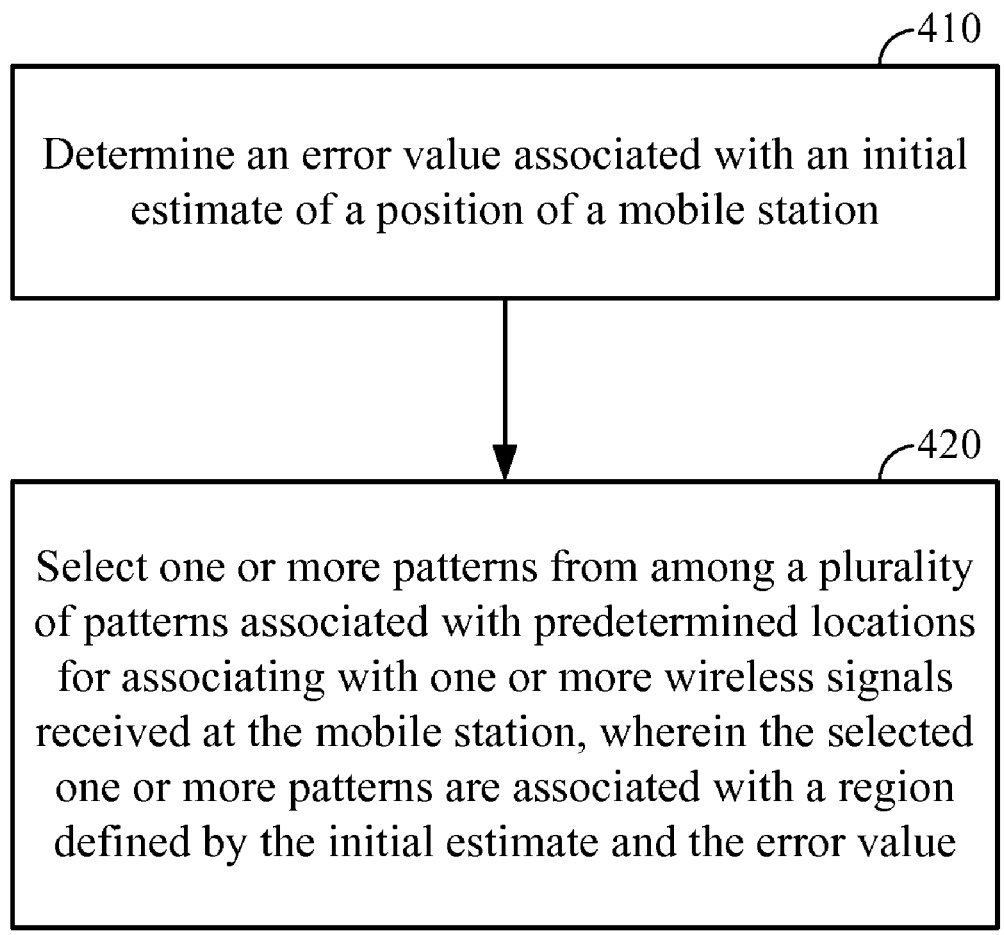
FIG. 4 is a flow diagram of an example technique for filtering one or more signal attribute patterns from use in mobile station position estimation.
Figure 5:
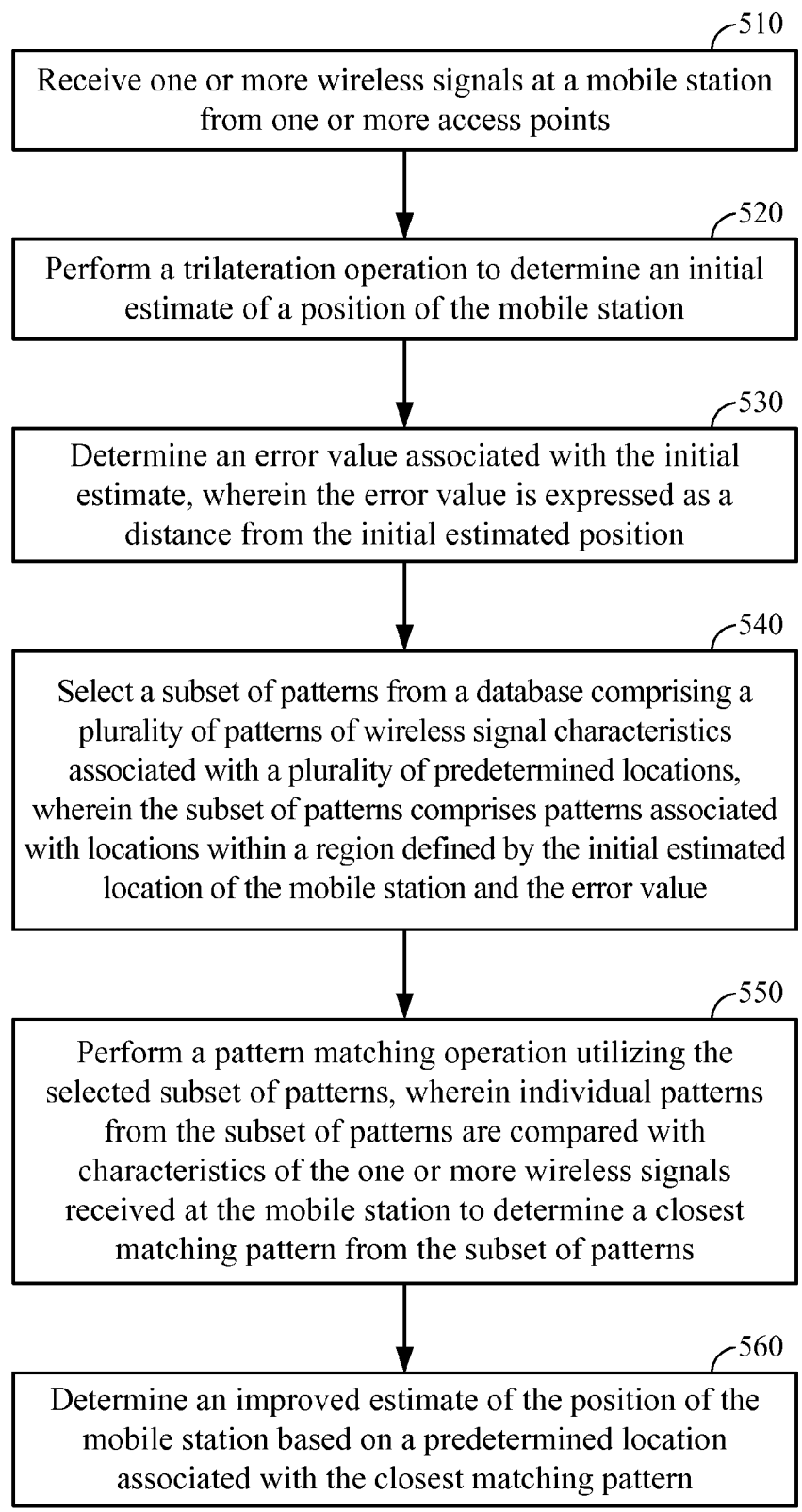
FIG. 5 is a flow diagram of an example process for filtering one or more signal attribute patterns from use in mobile station position estimation.

The following example processes depicted in the flow charts of FIGS. 4 and 5 provide additional explanation of the techniques and general principles of example implementations described above. In the discussions to follow in connection with FIGS. 4 and 5, it may be helpful to refer to FIG. 3 for improved understanding.

FIG. 4 is a schematic block diagram of an example technique for filtering one or more signal attribute patterns from use in mobile station position estimation. At block 410, an error value associated with an initial estimate of a position of a mobile station may be determined. In an aspect, any of a wide range of techniques for determining an error value associated with a position estimate for a mobile station may be utilized in various implementations. For example, trilateration, triangulation, or multilateration operations may utilize signals received from various access points or other wireless transmitters to determine an initial estimate for the position of the mobile station. For individual access points, a distance to the mobile station may be compared with minimum and maximum range values stored at the access point, with the difference between the distance from the access point to the mobile station and the minimum and/or maximum range values observed from that access point defining an error. The error may be represented as a circle with a radius equal to the difference between the distance from the access point to the mobile station and the minimum and/or maximum range values observed from that access point. An error region may comprise a union of a plurality of such circles defined for a plurality access points whose signals were received as part of initial position estimation operations for the mobile station.

Additional techniques for determining an initial estimate of a position of a mobile station may include, for example, utilizing a previously determined location estimate based on GPS signals to approximate an initial estimate. Sensors in a mobile device such as, for example, accelerometers or gyroscopes, may also be utilized to determine an initial estimate of a position of the mobile device based on a previously estimated location, for another example technique. The additional example techniques for determining an initial estimate of a position of a mobile station may have confidence parameters appropriate for the respective techniques that may be utilized in determining an error value. It should be noted that claimed subject matter is not limited to any particular technique for determining an error value associated with an initial estimate of a position of a mobile station.

At block 420, one or more patterns from among a plurality of patterns associated with predetermined locations for associating with one or more wireless signals received at the mobile station may be selected. The selected patterns may be associated with a region defined by the initial estimate of the position of the mobile station and the error value. As previously explained, the reduced number of patterns makes it quicker or less taxing on processing or storage resources to determine an improved estimated position for the mobile station. Example implementations in accordance with claimed subject matter may include all of, less than, or more than, blocks 410-420. Further, the order of blocks 410-420 is merely an example, and the scope of claimed subject matter is not limited in this respect.

FIG. 5 is a schematic block diagram of an example process for filtering one or more signal attribute patterns from use in mobile station position estimation. At block 510, one or more wireless signals may be received at a mobile station from one or more access points. A trilateration operation may be performed at block 520 to determine an initial estimate of a position of the mobile station. The trilateration operation may be based, at least in part, on one or more characteristics of the one or more wireless signals received at the mobile station from the access points. At block 530, an error value associated with the initial estimate of the position of the mobile station may be determined. The error value, in an aspect, may be expressed as a distance from the trilateration point, which as mentioned above serves as an initial estimate of the position of the mobile station.

At least in part in response to a determination of the initial estimate of the position of the mobile station, a subset of patterns may be selected from a database comprising a plurality of patterns of wireless signal characteristics associated with a plurality of predetermined locations at block 540. The subset of patterns may comprise patterns associated with predetermined locations within a region defined by the initial estimated position of the mobile station and the error value. At block 550, a pattern matching operation may be performed utilizing the selected subset of patterns. Individual patterns from the subset of patterns may be compared with characteristics of one or more wireless signals received at the mobile station to determine a closest matching pattern from the subset of patterns. An improved estimate of the position of the mobile station based on a predetermined location associated with the closest matching pattern may be determined at block 560. Of course, example implementations in accordance with claimed subject matter may include all, more than, or fewer than blocks 510-560. Further, the order of blocks 510-560 is merely an example order, and the scope of claimed subject matter is not limited in this respect.

Figure 6:
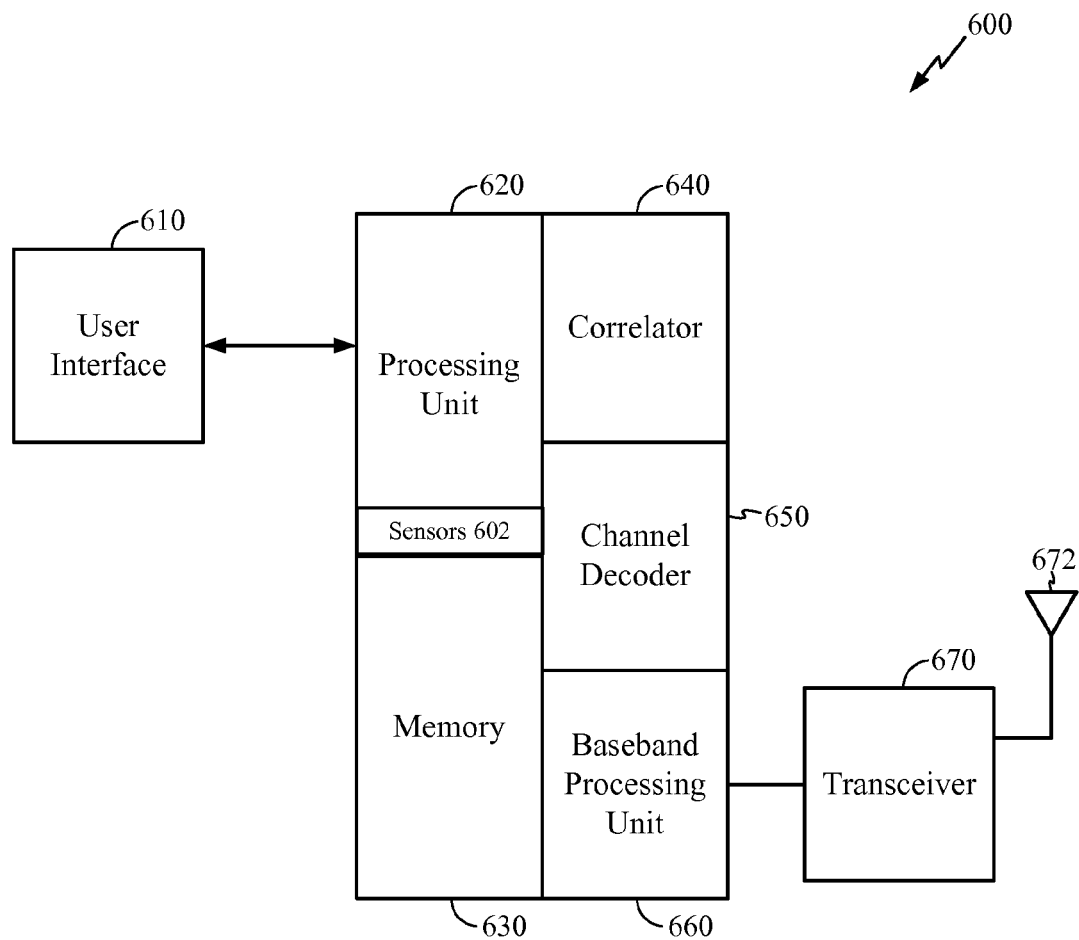
FIG. 6 is a schematic block diagram illustrating an example implementation of a mobile station.

FIG. 6 is a block diagram illustrating example mobile station 600 that may be adapted to perform any of the example techniques described herein related to mobile stations. For example, mobile station 600, as described previously, may perform trilateration calculations based on one or more wireless signal characteristics received at the mobile station to determine an initial estimated location for the mobile station. As further described above, mobile station 600 may perform pattern matching operations to determine an improved estimated location for the mobile station. Mobile station 600 may further communicate with other system resources, such as, for example, a location server, as depicted in FIG. 1. Of course, these are merely example functions of mobile station 600, and the scope of claimed subject matter is not limited in this respect.

In an aspect of example mobile station 600, one or more radio transceivers 670 may be adapted to modulate an RF carrier signal with baseband information, such as voice or data, onto an RF carrier, and demodulate a modulated RF carrier to obtain such baseband information. Transceiver 670 may include a receiver and a transmitter. An antenna 672 may be adapted to transmit a modulated RF carrier over a wireless communications link and receive a modulated RF carrier over a wireless communications link.

A baseband processor 660 may be adapted to provide baseband information from a processing unit (PU) 620 to transceiver 670 for transmission over a wireless communications link. Here, PU 620 may obtain such baseband information from an input device within a user interface 610. Baseband processor 660 may also be adapted to provide baseband information from transceiver 670 to PU 620 for transmission through an output device within user interface 610.

User interface 610 may comprise a plurality of devices for inputting or outputting user information such as voice or data. Such devices may include, by way of non-limiting examples, a keyboard/keypad, knobs/wheels, a display screen (e.g., a touch screen), a microphone, and a speaker.

Transceiver 670 may provide demodulated information to correlator 640. Correlator 640 may be adapted to derive beacon-related correlation functions from information relating to beacon signals provided by transceiver 670. This information may be used by mobile station 600 to acquire wireless communications services, for example from a wireless access point such as any of access points 330. Channel decoder 650 may be adapted to decode channel symbols received from baseband processor 660 into underlying source bits. In one example where channel symbols comprise convolutionally encoded symbols, such a channel decoder may comprise a Viterbi decoder. In a second example, where channel symbols comprise serial or parallel concatenations of convolutional codes, channel decoder 650 may comprise a turbo decoder.

A memory 630 may be adapted to store machine-readable instructions which may be executable to perform one or more of processes, implementations, or examples thereof which are described or suggested herein. PU 620 may access and execute such machine-readable instructions, thereby enabling mobile station 600 to perform one or more of the processes, implementations, and/or examples described and/or suggested herein, e.g., in connection with FIGS. 1-5. Mobile station may also comprise one or more sensors 602, such as, for example, an accelerometer or a gyroscope. Of course, mobile station 600 is merely an example, and the scope of claimed subject matter is not limited to the specific configuration of components and/or functional units depicted.

Figure 7:
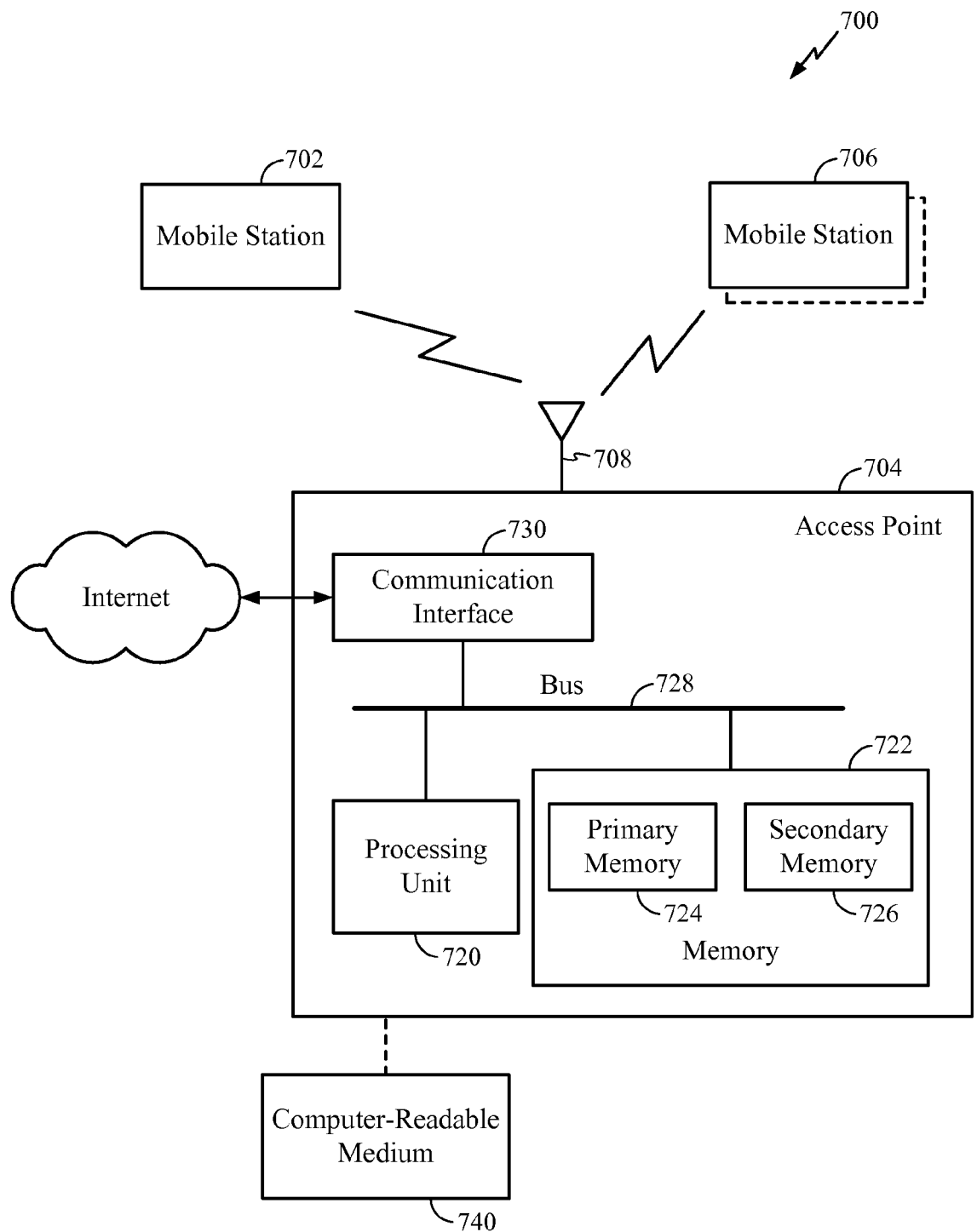
FIG. 7 is a schematic block diagram depicting an example wireless communication system including a plurality of computing platforms comprising one or more transmitters and one or more mobile stations.

FIG. 7 is a schematic diagram illustrating a system that may include one or more devices adapted or adaptable to implement techniques and/or processes described, for example, in connection with example techniques depicted in FIGS. 1-5. System 700 may include, for example, a mobile station 702, an access point 704, and a mobile station 706. Mobile stations 702 and 706 may communicate with access point 704 via antenna 708 of access point 704.

Although devices 702 and 706 are depicted as mobile stations, these are merely examples of wireless terminals that may be representative of any device, appliance or machine that may be configurable to exchange data over a wireless communications network. By way of example but not limitation, access point 704 may comprise a stand-alone device including one or more radios, or access point 704 may be implemented as at least a portion of one or more computing devices and/or platforms, such as, e.g., a desktop computer, a laptop computer, a workstation, a server device, or the like, although the scope of claimed subject matter is not limited in this respect. Mobile stations 702 and/or 706 may comprise one or more personal computing or communication devices or appliances, such as, e.g., a personal digital assistant, tablet, mobile communication device, or the like.

Similarly, the wireless communications depicted between access point 704 and mobile stations 702 and 706, as shown in FIG. 7, is representative of any communication links, processes, and/or resources configurable to support the wireless exchange of data between access point 704 and one or more of mobile stations 702 and 706. As illustrated, for example, by the dashed lined box illustrated as being partially obscured by mobile station 706, there may be additional like devices establishing wireless communications with access point 704.

It is recognized that all or part of the various devices and networks discussed, and the processes and techniques as further described herein, may be implemented using or otherwise including hardware, firmware, software, or any combination thereof.

Thus, by way of example but not limitation, access point 704 may include at least one processing unit 720 that is operatively coupled to a memory 722 through a bus 728.

Processing unit 720 is representative of one or more circuits configurable to perform at least a portion of a data computing procedure or process. By way of example but not limitation, processing unit 720 may include one or more processors, controllers, microprocessors, microcontrollers, application specific integrated circuits (ASICs), digital signal processors, programmable logic devices, field programmable gate arrays, and the like, or any combination thereof.

Memory 722 is representative of any data storage mechanism. Memory 722 may include, for example, a primary memory 724 and/or a secondary memory 726. Primary memory 724 may include, for example, a random access memory, read only memory, etc. While illustrated in this example as being separate from processing unit 720, it should be understood that all or part of primary memory 724 may be provided within or otherwise co-located/coupled with processing unit 720.

Secondary memory 726 may include, for example, the same or similar type of memory as primary memory and/or one or more data storage devices or systems, such as, for example, a disk drive, an optical disc drive, a tape drive, a solid state memory drive/flash drive, etc. In certain implementations, secondary memory 726 may be operatively receptive of, or otherwise configurable to couple to, a computer-readable medium 740. Computer-readable medium 740 may include, for example, any medium that can store and/or make accessible data, code and/or instructions for one or more of the devices in system 700. Computer readable medium 740 may also be referred to as a storage medium.

Access point 704 may further include, for example, a communication interface 730 that provides for or otherwise supports wireless communication with one or more wireless terminals such as mobile stations 702 and 706. Communication interface 730 may further support communication with a wired network such as the Internet as depicted in FIG. 7. By way of example but not limitation, communication interface 730 may include a network interface device or card, a modem, a router, a switch, a transceiver, a process, and/or the like.

The methodologies described herein may be implemented by various means depending upon applications according to particular examples. For example, such methodologies may be implemented in hardware, firmware, software, and/or combinations thereof. In an implementation involving hardware, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other units designed to perform the functions described herein, and/or combinations thereof.

"Instructions" as referred to herein relate to expressions which represent one or more logical operations. For example, instructions may be "machine-readable" by being interpretable by a machine (e.g., processing unit/computer) for executing one or more operations on one or more data objects. However, this is merely an example of instructions and claimed subject matter is not limited in this respect. In another example, instructions as referred to herein may relate to encoded commands which are executable by a processing circuit having a command set which includes the encoded commands. Such an instruction may be encoded in the form of a machine language understood by a processing circuit. Again, these are merely examples of an instruction and claimed subject matter is not limited in this respect.

"Storage medium" as referred to herein relates to media capable of maintaining expressions which are perceivable by one or more machines. For example, a storage medium may comprise one or more storage devices for storing machine-readable instructions and/or information. Such storage devices may comprise any one of several media types including, for example, magnetic, optical or semiconductor storage media. Such storage devices may also comprise any type of long term, short term, volatile or non-volatile memory devices. However, these are merely examples of a storage medium, and claimed subject matter is not limited in these respects.

Wireless communication techniques described herein may be in connection with various wireless communication networks such as a wireless wide area network (WWAN), a wireless local area network (WLAN), a wireless personal area network (WPAN), and so on. The terms "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network, or any combination of the above networks, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may comprise an IEEE 802.11x network, and a WPAN may comprise a Bluetooth network, an IEEE 802.15x, for example. Wireless communication implementations described herein may also be used in connection with any combination of WWAN, WLAN and/or WPAN.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, GLONASS or Compass may transmit a signal marked with a PN code that is distinguishable from PN codes transmitted by other SVs in the constellation (e.g., using different PN codes for each satellite as in GPS or using the same code on different frequencies as in GLONASS). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system (s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

As used herein, a mobile station (MS) refers to a device such as a cellular or other wireless communication device, personal communication system (PCS) device, personal navigation device (PND), Personal Information Manager (PIM), Personal Digital Assistant (PDA), laptop, tablet or other suitable mobile device which is capable of receiving wireless communication and/or navigation signals. The term "mobile station" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile station."

The methodologies described herein may be implemented by various means depending upon the application. For example, these methodologies may be implemented in hardware, firmware, software, or any combination thereof. For an implementation involving hardware, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processing unit. Memory may be implemented within the processing unit or external to the processing unit. As used herein the term "memory" refers to any type of long term, short term, volatile, nonvolatile, or other memory and is not to be limited to any particular type of memory or number of memories, or type of media upon which memory is stored.

For an implementation involving firmware and/or software, the functions may be stored as one or more instructions or code on a computer-readable medium. Examples include computer-readable media encoded with a data structure and computer-readable media encoded with a computer program. Computer-readable medium may take the form of an article of manufacture. Computer-readable media includes physical storage media. A storage medium may be any available medium that can be accessed by a machine. For example, a storage medium may comprise one or more storage devices for storing machine-readable instructions and/or information. By way of example, and not limitation, computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data are configured to cause one or more processing units to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The term "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using signals. Such signals may comprise electrical signals, digital signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

The invention claimed is:

1. A method, comprising:
    determining an error value associated with an initial estimate of a position of a mobile station; and
    selecting one or more patterns from among a plurality of patterns associated with predetermined locations, wherein the one or more patterns are selected by comparing one or more wireless signal characteristics of wireless signals received at the mobile station with the one or more patterns associated with the one or more predetermined locations within a region defined by the error value and the initial estimate to determine a closest pattern match.

2. The method of claim 1, further comprising performing said initial estimate of the position of the mobile station based at least in part on a plurality of individual locations for a plurality of access points.

3. The method of claim 2, wherein said performing the initial estimate of the position of the mobile station comprises performing a trilateration operation based on the plurality of individual locations of the plurality of access points.

4. The method of claim 3, wherein said determining the error value comprises determining the error value based at least in part on an estimated range of error related to the trilateration operation, wherein the error value is expressed as a distance from the initial estimate of the position of the mobile station.

5. The method of claim 1, wherein said performing the initial estimate of the position of the mobile station is based at least in part on one or more wireless signals from a satellite positioning system (SPS).

6. The method of claim 1, wherein said performing the initial estimate of the position of the mobile station is based at least in part on information from one or more sensors.

7. The method of claim 1, wherein a predetermined location associated with said closest pattern match represents an improved estimate of the position of the mobile station.

8. The method of claim 1, wherein said one or more wireless signal characteristics of the one or more wireless signals received at the mobile station comprises one or more signal strength characteristics.

9. The method of claim 1, wherein said one or more wireless signal characteristics of the one or more wireless signals received at the mobile station comprises one or more signal timing characteristics.

10. An article, comprising:
    a non-transitory computer-readable medium having stored thereon instructions executable by a processing unit in a mobile station, the instructions comprising:
        code to determine an error value associated with an initial estimate of a position of a mobile station; and
        code to select one or more patterns from among a plurality of patterns associated with predetermined locations, wherein the one or more patterns are selected by comparing one or more wireless signal characteristics of wireless signals received at the mobile station with the one or more patterns associated with the one or more predetermined locations within a region defined by the error value and the initial estimate to determine a closest pattern match.

11. The article of claim 10, wherein the instructions further comprise code to perform said initial estimate of the position of the mobile station based at least in part on a plurality of individual locations for a plurality of access points.

12. The article of claim 11, wherein the instructions further comprise code to perform the initial estimate of the position of the mobile station at least in part by performing a trilateration operation based on the plurality of individual locations of the plurality of access points.

13. The article of claim 12, wherein the instructions further comprise code to determine the error value at least in part by determining the error value based at least in part on an estimated range of error related to the trilateration operation, wherein the error value is expressed as a distance from the initial estimate of the position of the mobile station.

14. The article of claim 10, wherein the instructions further comprise code to perform the initial estimate of the position of the mobile station based at least in part on one or more wireless signals from a satellite positioning system (SPS).

15. The article of claim 10, wherein the instructions further comprise code to perform the initial estimate of the position of the mobile station based at least in part on information from one or more sensors.

16. The article of claim 10, wherein a predetermined location associated with said closest pattern match represents an improved estimate of the position of the mobile station.

17. The article of claim 10, wherein said one or more wireless signal characteristics of the one or more wireless signals received at the mobile station comprises one or more signal strength characteristics.

18. The article of claim 10, wherein said one or more wireless signal characteristics of the one or more wireless signals received at the mobile station comprises one or more signal timing characteristics.

19. A apparatus, comprising:
    means for determining an error value associated with an initial estimate of a position of a mobile station; and means for selecting one or more patterns from among a plurality of patterns associated with predetermined locations, wherein the means for selecting the one or more patterns comprises means for comparing one or more wireless signal characteristics of wireless signals received at the mobile station with the one or more patterns associated with the one or more predetermined locations within a region defined by the error value and the initial estimate to determine a closest pattern match.

20. The apparatus of claim 19, further comprising means for performing said initial estimate of the position of the mobile station based at least in part on a plurality of individual locations for a plurality of access points.

21. The apparatus of claim 20, wherein said means for performing the initial estimate of the position of the mobile station comprises means for performing a trilateration operation based on the plurality of individual locations of the plurality of access points.

22. The apparatus of claim 21, wherein said means for determining the error value comprises means for determining the error value based at least in part on an estimated range of error related to the trilateration operation, wherein the error value is expressed as a distance from the initial estimate of the position of the mobile station.

23. The apparatus of claim 19, wherein said means for performing the initial estimate of the position of the mobile station comprises means for performing the initial estimate based at least in part on one or more wireless signals from a satellite positioning system (SPS).

24. The apparatus of claim 19, wherein said means for performing the initial estimate of the position of the mobile station comprises means for performing the initial estimate based at least in part on information from one or more sensors.

25. The apparatus of claim 19, wherein a predetermined location associated with said closest pattern match represents an improved estimate of the position of the mobile station.

26. The apparatus of claim 19, wherein said one or more wireless signal characteristics of the one or more wireless signals received at the mobile station comprises one or more signal strength characteristics.

27. The apparatus of claim 19, wherein said one or more wireless signal characteristics of the one or more wireless signals received at the mobile station comprises one or more signal timing characteristics.

28. A mobile station, comprising:
a receiver to receive one or more wireless signals from one or more access points; and
a processing unit adapted to:
determine an error value associated with an initial estimate of a position of a mobile station, and
select one or more patterns from among a plurality of patterns associated with predetermined locations, wherein the one or more patterns are selected by comparing one or more wireless signal characteristics of wireless signals received at the mobile station with the one or more patterns associated with the one or more predetermined locations within a region defined by the error value and the initial estimate to determine a closest pattern match.

29. The mobile station of claim 28, said processing unit further adapted to perform said initial estimate of the position of the mobile station based at least in part on a plurality of individual locations for a plurality of access points.

30. The mobile station of claim 29, said processing unit further adapted to perform the initial estimate of the position of the mobile station at least in part by performing a trilateration operation based on the plurality of individual locations of the plurality of access points.

31. The mobile station of claim 30, said processing unit further adapted to determine the error value based at least in part on an estimated range of error related to the trilateration operation, wherein the error value is expressed as a distance from the initial estimate of the position of the mobile station.

32. The mobile station of claim 28, said processing unit further adapted to perform the initial estimate of the position of the mobile station based at least in part on one or more wireless signals from a satellite positioning system (SPS).

33. The mobile station of claim 28, wherein said processing unit is further adapted to perform the initial estimate of the position of the mobile station based at least in part on information from one or more sensors.

34. The mobile station of claim 28, wherein a predetermined location associated with said closest pattern match represents an improved estimate of the position of the mobile station.

35. The mobile station of claim 28, wherein said one or more wireless signal characteristics of the one or more wireless signals received at the mobile station comprises one or more signal strength characteristics.

36. The mobile station of claim 28, wherein said one or more wireless signal characteristics of the one or more wireless signals received at the mobile station comprises one or more signal timing characteristics.

* * * * *